United States Patent
McDavid

(10) Patent No.: US 10,422,237 B2
(45) Date of Patent: Sep. 24, 2019

(54) FLOW DIVERTER CASE ATTACHMENT FOR GAS TURBINE ENGINE

(71) Applicant: United Technologies Corporation, Farmington, CT (US)

(72) Inventor: Bruce S. McDavid, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 367 days.

(21) Appl. No.: 15/484,215

(22) Filed: Apr. 11, 2017

(65) Prior Publication Data

US 2018/0291754 A1  Oct. 11, 2018

(51) Int. Cl.
| | | |
|---|---|---|
| F01D 11/24 | (2006.01) | |
| F01D 25/12 | (2006.01) | |
| F01D 25/08 | (2006.01) | |
| F02C 6/08 | (2006.01) | |
| F01D 9/06 | (2006.01) | |
| F02C 7/18 | (2006.01) | |
| F01D 25/14 | (2006.01) | |

(52) U.S. Cl.
CPC ............. F01D 9/065 (2013.01); F01D 25/14 (2013.01); F02C 6/08 (2013.01); F02C 7/18 (2013.01); F02C 7/185 (2013.01); *F01D 11/24* (2013.01); *F01D 25/12* (2013.01)

(58) Field of Classification Search
CPC . F01D 5/187; F01D 9/06; F01D 9/065; F01D 25/12; F01D 25/14; F04D 29/584; F04D 29/5846; F05D 2260/20; F05D 2260/211; F05B 2260/20; F05B 2260/211; F02C 6/08; F02C 7/18; F02C 7/185

See application file for complete search history.

(56) References Cited

U.S. PATENT DOCUMENTS

| | | | | |
|---|---|---|---|---|
| 5,116,199 A | * | 5/1992 | Ciokajlo | F01D 11/24 415/116 |
| 5,154,578 A | * | 10/1992 | Miraucourt | F01D 11/24 415/115 |
| 5,212,940 A | * | 5/1993 | Glover | F01D 11/20 415/115 |
| 5,980,201 A | * | 11/1999 | Benoist | F01D 25/14 415/115 |
| 5,993,150 A | * | 11/1999 | Liotta | F01D 11/10 415/115 |
| 6,647,730 B2 | * | 11/2003 | Liu | F01D 5/081 415/116 |
| 8,240,997 B2 | | 8/2012 | Shirahama et al. | |
| 9,598,974 B2 | * | 3/2017 | Gekht | F01D 11/24 |
| 2012/0167588 A1 | * | 7/2012 | Dierksmeier | F01D 11/24 60/785 |

(Continued)

*Primary Examiner* — Todd E Manahan
*Assistant Examiner* — Eric W Linderman
(74) *Attorney, Agent, or Firm* — Carlson, Gaskey & Olds, P.C.

(57) ABSTRACT

A gas turbine engine includes a case having a wall that provides a cavity. The wall includes an aperture and a bore. A tube assembly with a flange provides a fluid passage aligned with the aperture. A flow diverter is arranged in the cavity and includes a plate with a hole. An insert has a body and a head. The body is received in the hole and press-fit in the bore. The head captures the plate against the wall. A fastener secures the flange to the insert and clamps the flow diverter to the case.

9 Claims, 3 Drawing Sheets

(56) References Cited

U.S. PATENT DOCUMENTS

| | | | |
|---|---|---|---|
| 2013/0192239 A1* | 8/2013 | Glahn | F01D 25/18 |
| | | | 60/772 |
| 2016/0017755 A1 | 1/2016 | Low | |
| 2016/0201688 A1* | 7/2016 | Lyons | F01D 9/065 |
| | | | 60/751 |
| 2017/0268783 A1* | 9/2017 | Cihlar | F23R 3/002 |
| 2018/0209284 A1* | 7/2018 | Day | F01D 9/06 |
| 2018/0291760 A1* | 10/2018 | Ortiz | F01D 11/20 |
| 2018/0291762 A1* | 10/2018 | Ortiz | F01D 25/12 |
| 2018/0334961 A1* | 11/2018 | Hanrahan | F02C 7/18 |

\* cited by examiner

FLOW DIVERTER CASE ATTACHMENT FOR GAS TURBINE ENGINE

STATEMENT REGARDING FEDERALLY SPONSORED RESEARCH OR DEVELOPMENT

This invention was made with government support under Contract No. FA8626-16-C-2139 awarded by the United States Air Force. The Government has certain rights in this invention.

BACKGROUND

This disclosure relates to flow diverter for circulating a cooling fluid within a gas turbine engine. More particularly, the disclosure relates to an attachment configuration for securing the flow diverter relative to a case structure of an engine static structure.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A region between the high pressure compressor and the combustor section may be hot such that cooling fluid is desired. In some gas turbine engines, an upstream compressor stage supplies cooling fluid, which is introduced through an outer case near the combustor section. Typically, the cooling fluid passes through a heat exchanger and is then supplied to a tube assembly that is arranged in a radial direction at a right angle tangent to the outer case.

SUMMARY

In one exemplary embodiment, a gas turbine engine includes a case having a wall that provides a cavity. The wall includes an aperture and a bore. A tube assembly with a flange provides a fluid passage aligned with the aperture. A flow diverter is arranged in the cavity and includes a plate with a hole. An insert has a body and a head. The body is received in the hole and press-fit in the bore. The head captures the plate against the wall. A fastener secures the flange to the insert and clamps the flow diverter to the case.

In a further embodiment of any of the above, a combustor section arranged between a compressor section and a turbine section. The flow diverter is arranged upstream from the combustor section and radially outward from a vane in the compressor section.

In a further embodiment of any of the above, the vane is supported by an outside wall. The case is an outer case. The cavity is arranged radially between the outer case and the outside wall. The flow diverter is configured to move a cooling fluid circumferentially about the cavity.

In a further embodiment of any of the above, a heat exchanger is fluidly connected to the tube assembly. The heat exchanger is arranged fluidly between a compressor stage in the compressor section and the cavity.

In a further embodiment of any of the above, the flow diverter includes a baffle supported by multiple legs that are joined to the plate.

In a further embodiment of any of the above, the flow diverter includes a J-tube joined to the plate and fluidly coupled to the hole.

In a further embodiment of any of the above, the wall includes an unmachined inner surface. A gasket is provided between the unmachined inner surface and the plate.

In a further embodiment of any of the above, the plate includes first and second faces spaced apart from one another. The wall includes an inner surface. The first face and the inner surface are adjacent to one another. The head abuts the second face.

In a further embodiment of any of the above, the body includes a threaded hole. The fastener is a bolt received in the threaded hole.

In a further embodiment of any of the above, the hole is larger than an outer diameter of the body.

In another exemplary embodiment, a case assembly for a gas turbine engine includes a wall that includes an aperture and a bore. A flow diverter includes a plate with a hole. An insert has a body and a head. The body is received in the hole and press-fit in the bore. The head captures the plate against the wall. A fastener secures the flow diverter to the outer case with the head.

In a further embodiment of any of the above, the flow diverter includes a baffle supported by multiple legs that are joined to the plate.

In a further embodiment of any of the above, the flow diverter includes a J-tube joined to the plate and fluidly coupled to the hole.

In a further embodiment of any of the above, the wall includes an unmachined inner surface. A gasket is provided between the unmachined inner surface and the plate.

In a further embodiment of any of the above, the plate includes first and second faces spaced apart from one another. The wall includes an inner surface. The first face and the inner surface are adjacent to one another. The head abuts the second face.

In a further embodiment of any of the above, the body includes a threaded hole. The fastener is a bolt received in the threaded hole.

In one exemplary embodiment, a method of assembling a flow diverter in a gas turbine engine includes arranging a plate of a flow diverter adjacent to a case wall. An insert is pressed into a bore of the case wall. The plate is retained relative to the case wall with the insert in response to the pressing step.

In a further embodiment of any of the above, the arranging step includes aligning an opening in the plate with an aperture in the case wall. A tube assembly is secured to the case wall to fluidly connect the tube assembly to the opening.

In a further embodiment of any of the above, the insert includes a body and a head. The pressing step includes pushing the body into the bore in an interference-fit relationship. The retaining step includes capturing the plate to the case wall with the head.

In a further embodiment of any of the above, the securing step includes threading a fastener into the body to clamp the plate to the case wall with the head.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
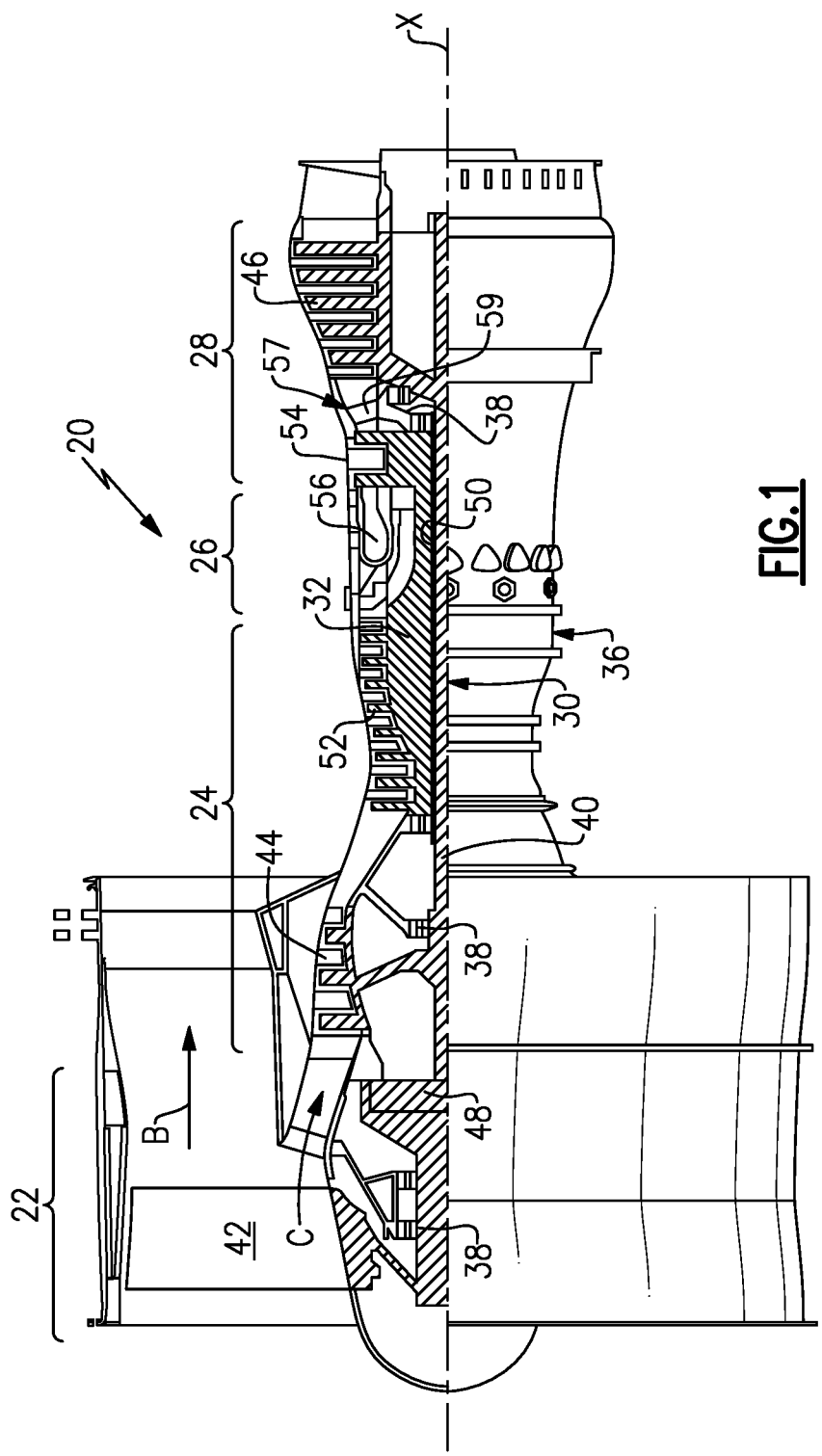
FIG. 1 is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
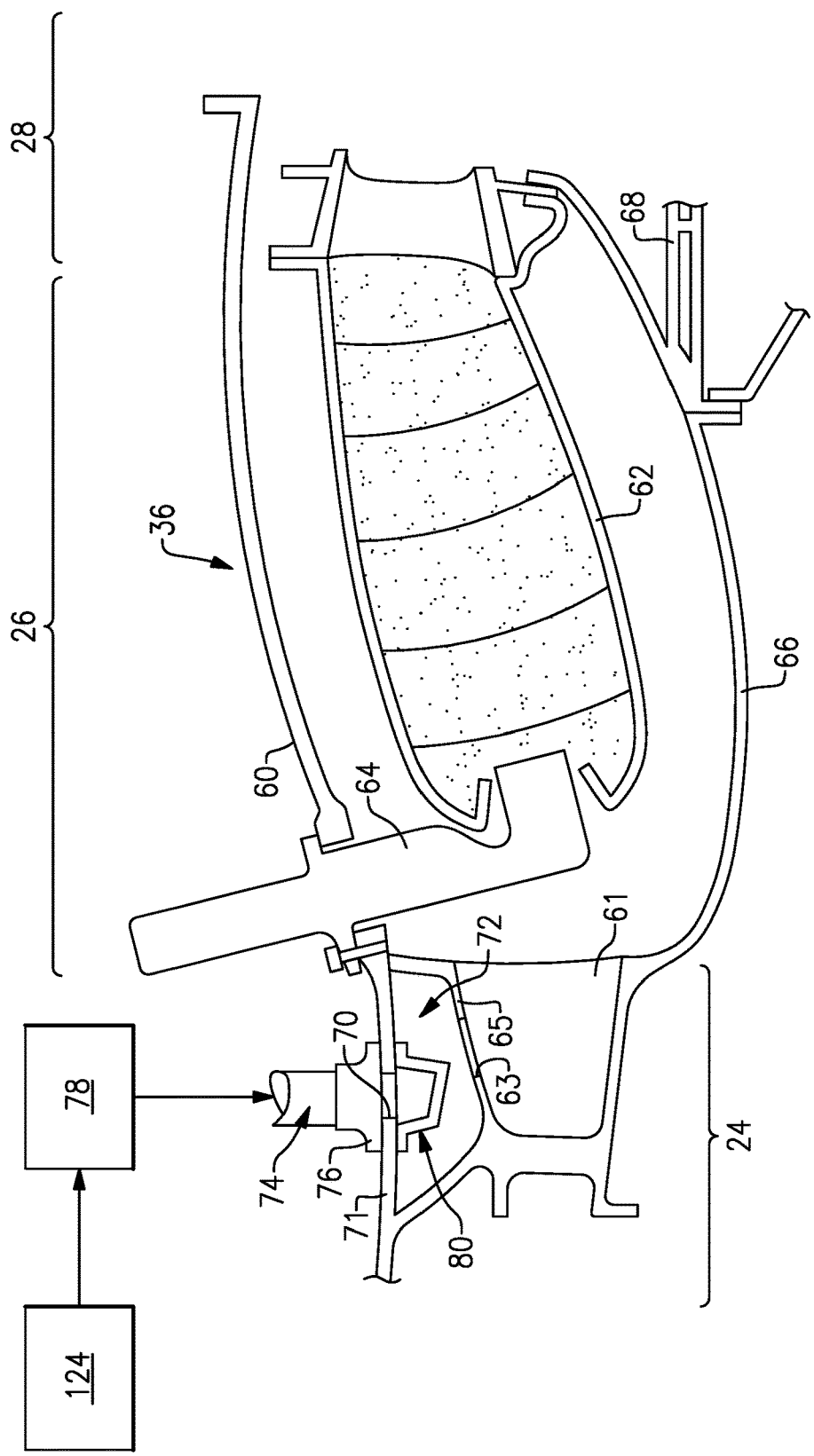
FIG. 2 is an enlarged cross-sectional view through a combustor section and adjacent regions, with a flow diverter secured to an outer case.

Referring to FIG. 2, a compressor stage 124 supplies fluid to a heat exchanger 78, which delivers cooling fluid through a tube assembly 74 to an outer case 60 of the engine static structure 36 near the combustor section 26. In the example, the tube assembly 74 has a flange 76 secured to a wall 71 of the outer case 60 that provides a fluid passage aligned with an aperture 70 in the outer case 60. In one example engine, twenty-four tube assemblies are circumferentially spaced about the outer circumference of the outer case 60 to supply the desired cooling fluid.

The combustor section 26 includes a combustor liner 62 arranged within the outer case 60. A fuel injector 64 delivers fuel to the interior of the combustor liner 62. Air is circulated about the combustor liner 62 and upstream from the turbine section 28 to cool various components. For example, an inner diffuser case 66 maintains cooling flow about the combustor liner 62. A tangential onboard injector (TOBI) 68 injects the cooling fluid to the turbine section 28.

In one example, cooling fluid is provided near a last stage of the compressor section 24 upstream from the combustor section 26. The compressor section 24 includes a vane 61 supported with respect to the outer case 60 by an outside wall 65. A cavity 72 is provided between the outer case 60 and the outside wall 65. An opening 63 in the outside wall 65 fluidly communicates the cooling fluid from the cavity 72 to the area upstream from the combustor section 26.

The cooling fluid supplied by the heat exchanger 78 may not be evenly distributed around the diffuser case 66, creating hot and cold portions on the diffuser case 66 in an alternating pattern, which could lead to durability issues. In order to evenly distribute the cooling fluid, a flow diverter 80 is arranged in the cavity 72 and secured to the outer case 60 and at least partially blocks the cooling flow through the aperture 70 into the cavity 72 (block arrow in FIG. 3) to circulate the cooling fluid in a circumferential direction to avoid hot spots.

Figure 3:
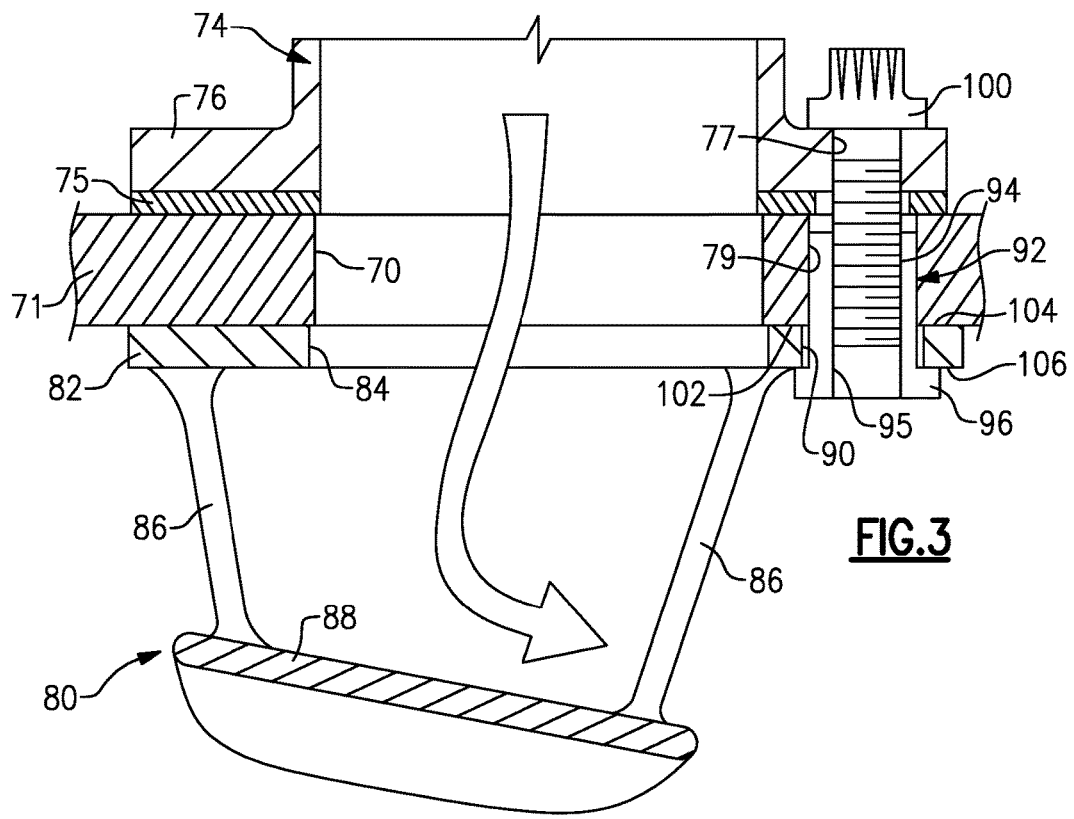
FIG. 3 depicts an enlarged portion of FIG. 2 illustrating a cooling air supply upstream from the combustor section.

Referring to FIG. 3, the flow diverters 80 are attached to the outer case 60 by utilizing press-fit inserts 92 that are used to bolt down the tube assembly 74. A gasket 75 is provided between the outer case 60 and the flange 76. A bore 79 is provided in the outer case 60 and is aligned with the hole 77 in the flange 76. The inserts 92 are added at assembly and do not need to be welded in place or incorporated into the case's casting. The flow diverter 80 includes a plate 82 that is held in place by the press-fit inserts 92.

Figure 4:
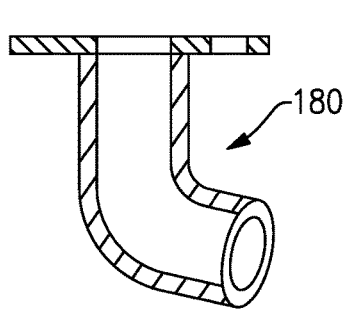
FIG. 4 illustrates an alternate flow diverter.

In one example arrangement, the plate 82 has an opening 84 that is aligned with the aperture 70 in the wall 71. With the example flow diverter 80, a baffle 88 is joined to the plate 82 with multiple legs 86. Other flow diverters 180 may be used, such a J-tube configuration joined to its plate (FIG. 4).

Returning to FIG. 3, the insert 92 includes a body 94 having a first diameter and a head 96 extending radially from an end of the body 94 and that has a second diameter that is larger than the first diameter. The plate 82 includes a hole 90, which is larger than the first, or outside, diameter to provide assembly clearances. The insert 92 is pressed fit into the bore 79 such that the body 94 is in an interference relationship with the outer case 60. The head 96 captures the plate 82 against the wall 71. A fastener 100 is secured to threaded hole 95 in the insert 92, which clamps flange 76 and the flow diverter 80 when tightened such that a first face 104 of the plate 82 is adjacent to, and in the example shown, in engagement with, an inner surface 102 of the wall 71. The head 96 abuts a second face 106 of the plate 82, which is spaced apart from the first face 104, to capture the plate 82 against the wall 71.

Figure 5:
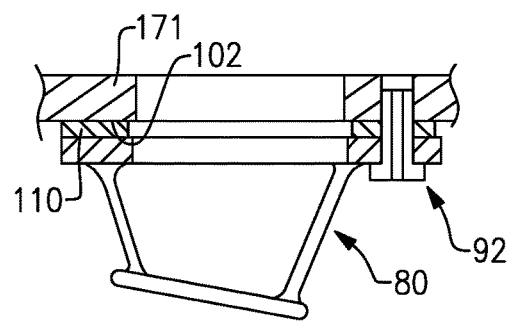
FIG. 5 depicts a flow diverter secured to a case structure with an unmachined inner surface.

In assemblies in which the inner surface 102 of the outer case 60 is not machined for the flow diverter 80 (e.g., left in its cast or forged condition; see FIG. 5), such as engines that might be retrofit with the flow diverters, a gasket 110 may be provided between the flow diverter 80 and the outer case 171. This arrangement also uses the insert 92 to secure the flow diverter 80, as described above in connection with FIG. 3.

During assembly, the plate 82 of the flow diverter 80 is arranged adjacent to the wall 71. The opening 84 is aligned with the aperture 70 in the wall 71. The insert 92 is pressed into the bore 79. The plate 82 is retained relative to the wall 71 with the insert 92 in response to the pressing step, where the body 94 is pushed into the bore 79 in an interference-fit relationship. The tube assembly 74 is secured to the wall 71 to fluidly connect the tube assembly 74 to the opening 84 by threading a fastener 100 into the body 94, which clamps the plate 82 to the wall 71 with the head 96.

The disclosed flow diverters 80 create a separable assembly from the outer case 60 and can be replaced individually as opposed to replacing the entire case or cooling tube, which leads to a more affordable and producible design. If a new flow diverter shape is developed, its incorporation into new engines will be relatively affordable. Such an upgrade would be a depot level change allowing mechanics to drill out the old inserts and simply replace the attachment rather than having to replace an expensive case or tubing assembly.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a case having a wall that provides a cavity, that wall including an aperture and a bore;
   a tube assembly with a flange that provides a fluid passage aligned with the aperture;
   a flow diverter arranged in the cavity and including a plate with a hole;
   an insert having a body and a head, the body received in the hole and press-fit in the bore, the head capturing the plate against the wall;
   a fastener securing the flange to the insert and clamping the flow diverter to the case; and
   a combustor section arranged between a compressor section and a turbine section, the flow diverter arranged upstream from the combustor section and radially outward from a vane in the compressor section.

2. The engine of claim 1, wherein the vane is supported by an outside wall, the case is an outer case, and the cavity is arranged radially between the outer case and outside wall, the flow diverter configured to move a cooling fluid circumferentially about the cavity.

3. The engine of claim 2, comprising a heat exchanger fluidly connected to the tube assembly, wherein the heat exchanger is arranged fluidly between a compressor stage in the compressor section and the cavity.

4. The engine of claim 1, wherein the flow diverter includes a baffle supported by multiple legs that are joined to the plate.

5. The engine of claim 1, wherein the flow diverter includes a J-tube joined to the plate and fluidly coupled to the hole.

6. The engine of claim 1, wherein the wall includes an unmachined inner surface, and a gasket is provided between the unmachined inner surface and the plate.

7. The engine of claim 1, wherein the plate includes first and second faces spaced apart from one another, and the wall includes an inner surface, the first face and the inner surface adjacent to one another, and the head abutting the second face.

8. The engine of claim 7, wherein the body includes a threaded hole, and the fastener is a bolt received in the threaded hole.

9. The engine of claim 1, wherein the hole is larger than an outer diameter of the body.

\* \* \* \* \*